United States Patent
Ooyama et al.

(10) Patent No.: US 10,964,986 B2
(45) Date of Patent: Mar. 30, 2021

(54) SEPARATOR FOR ELECTROCHEMICAL ELEMENTS, AND ELECTROCHEMICAL ELEMENT COMPRISING SAME

(71) Applicant: MITSUBISHI PAPER MILLS LIMITED, Tokyo (JP)

(72) Inventors: Keisuke Ooyama, Tokyo (JP); Takao Masuda, Tokyo (JP)

(73) Assignee: MITSUBISHI PAPER MILLS LIMITED, Tokyo (JP)

(*) Notice: Subject to any disclaimer, the term of this patent is extended or adjusted under 35 U.S.C. 154(b) by 16 days.

(21) Appl. No.: 16/342,407

(22) PCT Filed: Oct. 17, 2017

(86) PCT No.: PCT/JP2017/037458
§ 371 (c)(1),
(2) Date: Apr. 16, 2019

(87) PCT Pub. No.: WO2018/074442
PCT Pub. Date: Apr. 26, 2018

(65) Prior Publication Data
US 2019/0252661 A1    Aug. 15, 2019

(30) Foreign Application Priority Data

Oct. 17, 2016 (JP) .............. JP2016-203720
Sep. 11, 2017 (JP) .............. JP2017-174268

(51) Int. Cl.
| | | |
|---|---|---|
| H01M 50/00 | (2021.01) | |
| H01M 50/44 | (2021.01) | |
| D21H 13/02 | (2006.01) | |
| H01M 10/0525 | (2010.01) | |
| H01G 9/02 | (2006.01) | |
| H01G 11/52 | (2013.01) | |
| H01M 50/429 | (2021.01) | |
| H01M 50/409 | (2021.01) | |
| D01F 8/06 | (2006.01) | |
| D01F 8/02 | (2006.01) | |

(52) U.S. Cl.
CPC ............ H01M 50/44 (2021.01); D21H 13/02 (2013.01); H01G 9/02 (2013.01); H01G 11/52 (2013.01); H01M 10/0525 (2013.01); H01M 50/409 (2021.01); H01M 50/4295 (2021.01); D01F 8/02 (2013.01); D01F 8/06 (2013.01)

(58) Field of Classification Search
CPC .......... D21H 15/01; D21H 9/02; D21H 13/02; H01M 2/1626; H01M 2/16; D01F 8/06; H01G 9/02
See application file for complete search history.

(56) References Cited

U.S. PATENT DOCUMENTS

| | | | | |
|---|---|---|---|---|
| 2009/0017385 A1* | 1/2009 | Harada | ............... | H01M 2/1626 429/255 |
| 2015/0010828 A1* | 1/2015 | Kubo | ................... | H01M 10/24 429/246 |
| 2015/0064573 A1 | 3/2015 | Kaji et al. | | |

FOREIGN PATENT DOCUMENTS

| | | |
|---|---|---|
| JP | 2008-227296 | 9/2008 |
| JP | 2011-228320 | 11/2011 |
| JP | 2012-222266 | 11/2012 |
| JP | 2014-26877 | 2/2014 |
| JP | 2014-123443 | 7/2014 |
| JP | 2015-65153 | 4/2015 |
| JP | 2016-129094 | 7/2016 |
| WO | 2011/046066 | 4/2011 |
| WO | 2012/008559 | 1/2012 |

OTHER PUBLICATIONS

International Search Report and Written Opinion of the International Searching Authority, dated Jan. 9, 2018 in corresponding International Patent Application No. PCT/JP2017/037458, with English language translation of the International Search Report.
Japanese Office Action, dated Mar. 8, 2018 in corresponding Japanese Patent Application No. 2017-198138, with English language translation.
Office Action dated Apr. 20, 2020 in corresponding Korean Patent Application No. 10-2019-7010830 with English-language translation.

* cited by examiner

*Primary Examiner* — Cynthia H Kelly
*Assistant Examiner* — Monique M Wills
(74) *Attorney, Agent, or Firm* — Wenderoth, Lind & Ponack, L.L.P.

(57) ABSTRACT

An object of the invention is to provide a separator for an electrochemical element in which the occurrence of fluff on the sheet surface thereof is suppressed and an internal short-circuit defect rate is low, and the invention provides a separator for an electrochemical element, comprising: a fibrillated solvent spun cellulose fiber; and a synthetic fiber, wherein the separator for an electrochemical element contains, as the synthetic fiber, from 5 to 40% by weight of a core-sheath type composite fiber having a fiber diameter of 6.0 μm or less which is composed of: a core component made of a resin having a melting point of 160° C. or more; and a sheath component made of polyethylene.

4 Claims, No Drawings

SEPARATOR FOR ELECTROCHEMICAL ELEMENTS, AND ELECTROCHEMICAL ELEMENT COMPRISING SAME

TECHNICAL FIELD

The present invention relates to a separator for an electrochemical element, and an electrochemical element including the same.

BACKGROUND ART

Since a lithium secondary battery which is one kind of the electrochemical elements has an operating voltage of 3.7 V on average, which is approximately three times that of an alkaline secondary battery, it is used in a variety of applications as an electrochemical element having a high energy density. Applications include mobile phones, notebook computers, hybrid vehicles, electric vehicles, power storage applications and the like.

Since a capacitor which is one kind of the electrochemical elements has a large capacitance and high stability to repeated charge and discharge, it is becoming widely used in applications, for example, a power supply for use in vehicles or electric equipment.

The main member used in the electrochemical element includes a positive electrode, a negative electrode, a separator for an electrochemical element (hereinafter may be referred to as "separator" in some cases), and an electrolytic solution. The separator separates the positive electrode and the negative electrode such that the positive electrode and the negative electrode do not directly contact, that is, so as not to cause internal short-circuit in the electrochemical element. In order to lower the internal resistance of the electrochemical element, pores through which ions in the electrolytic solution are able to be efficiently transmitted must be formed in the inside of the separator. Therefore, the separator is required to be porous.

As the separator, a paper separator made mainly of cellulose or a separator made mainly of an inorganic fiber represented by a glass fiber has been known. Further, a separator composed of a wet nonwoven fabric which is produced by a wet paper making method and contains a synthetic fiber and a beaten solvent spun cellulose fiber (fibrillated solvent spun cellulose fiber) as the essential components is disclosed (for example, see Patent Documents 1 and 2).

The separator containing a synthetic fiber and a beaten solvent spun cellulose fiber as the essential components has an advantage in that an internal short-circuit defect rate is small. However, both the synthesis fiber and the beaten solvent spun cellulose fiber have a short fiber length and tend to cause insufficient entanglement of the fibers with each other.

Further, fibrils occur in the solvent-spun cellulose fiber by beating, and the fibrils are able to form a paper layer by being spot-glued together. However, since the solvent-spun cellulose is cellulose having high crystallinity, it has high rigidity, and even by pressing in the wet paper making process, the fibril itself is less crushed to be flattened and maintains the cross-sectional shape close to a circle. Therefore, after drying the wet fiber web formed by a wet paper making method at a Yankee dryer, upon the release of the dry fiber web from the Yankee dryer, the synthetic fiber and the beaten solvent spun cellulose fiber may be taken by the Yankee dryer. As a result, fluff is likely to occur on the Yankee dryer surface of the dry fiber web.

As means for solving the occurrence of fluff, there is a means for applying a release agent to the Yankee dryer.

CITATION LIST

Patent Literature

Patent Document 1: JP-A-2012-222266
Patent Document 2: JP-A-2015-065153

SUMMARY OF INVENTION

Technical Problem

However, in the case of applying a release agent, the release agent adhering to a separator is decomposed in an electrochemical element to produce impurity which may exert an adverse effect on the charge-discharge characteristics of the electrochemical element. Further, when the release agent is too much, although the release of the dry fiber web is improved, since adhesion to the Yankee dryer surface partially becomes so weak that release is caused, wrinkle (obliquely generating with respect to the flow direction, overlapping lines) or grain (phenomenon in which the separator surface becomes uneven) may sometimes occur. On the other hand, when the release agent is too less, the release of the dry fiber web is deteriorated, and fluff is likely to occur again on the Yankee dryer surface of the dry fiber web.

As to the separator having fluff on the surface of the dry fiber web, the fluff falls off during the slit processing or during the assembly processing of an electrochemical element and the fluff accumulated may sometimes stain transfer rollers. Further, in the assembly processing of an electrochemical element, an electrode group formed by laminating a positive electrode, a separator and a negative electrode is put into a case of the electrochemical element, an electrolytic solution is injected from an injection port, and then the injection port is sealed, but the fluff attached to the injection port may sometimes interfere with the sealing.

The present invention has been made in view of the circumstances described above, and an object of the invention is to provide a separator for an electrochemical element in which the occurrence of fluff on the sheet surface thereof is suppressed and an internal short-circuit defect rate is low, and an electrochemical element including the separator for an electrochemical element.

Solution to Problem

As a result of the intensive investigations to solve the problems described above, the inventions described below have been found.

(1) A separator for an electrochemical element, comprising: a fibrillated solvent spun cellulose fiber; and a synthetic fiber,
wherein the separator for an electrochemical element contains, as the synthetic fiber, from 5 to 40% by weight of a core-sheath type composite fiber having a fiber diameter of 6.0 μm or less which is composed of: a core component made of a resin having a melting point of 160° C. or more; and a sheath component made of polyethylene.

(2) The separator for an electrochemical element as described in (1) above,
wherein the fibrillated solvent spun cellulose fiber has a modified freeness measured by the method described below of 75 ml or more and 220 ml or less:

Modified freeness: a value measured in accordance with JIS P8121-2:2012, except that an 80-mesh wire netting having a wire diameter of 0.14 mm and an aperture size of 0.18 mm is used as a sieving plate and a sample concentration is set to 0.1% by weight.

(3) An electrochemical element, comprising: the separator for an electrochemical element as described in (1) or (2) above.

Advantageous Effects of Invention

In the separator for an electrochemical element of the invention, the adhesive strength of the sheet surface is improved by melting and adhering of the fibers during the drying for obtaining the sheet-form separator so that the occurrence of fluff is suppressed by containing from 5 to 40% by mass of a core-sheath type composite fiber which is composed of a core component made of a resin having a melting point of 160° C. or more and a sheath component made of polyethylene.

DESCRIPTION OF EMBODIMENTS

The separator for an electrochemical element and the electrochemical element including the separator for an electrochemical element of the invention will be described in more detail. In the specification, "weight" and "mass" are synonymous.

<Electrochemical Element>

As the electrochemical element of the invention, a capacitor is preferable. The capacitor includes, for example, an electric double layer capacitor, a hybrid capacitor and a redox capacitor. Further, as the electrochemical element, a lithium secondary battery is also preferable.

<Electric Double Layer Capacitor>

The electric double layer capacitor (EDLC) is a capacitor in which charge is accumulated in electric double layers formed on the surfaces of the positive electrode and the negative electrode. An EDLC having a larger capacity is obtained by making more ions to be able to adsorb on the surfaces of the positive electrode and the negative electrode.

In order to make more ions to be able to adsorb on the surfaces of the positive electrode and the negative electrode, it is necessary for the positive electrode and the negative electrode to have a larger specific surface area. Further, it is necessary for the positive electrode and the negative electrode of EDLC not to cause an electrochemical reaction. For the positive electrode and the negative electrode of EDLC, activated carbon; graphite; nanocarbon, for example, carbon nanofiber or graphene; or the like is mainly used as the material which satisfies these conditions.

As the electrolytic solution, an aqueous sulfuric acid solution, a solution obtained by dissolving a salt which does not cause an electrochemical reaction in the potential range used in a polar organic solvent, an ionic liquid or the like can be used.

The salt which does not cause an electrochemical reaction in the potential range used includes, for example, a salt of tetraethylammonium and tetrafluoroboric acid ($TEA \cdot BF_4$), a salt of triethylmethylammonium and tetrafluoroboric acid ($TEMA \cdot BF_4$) and a salt of 5-azoniaspiro[4.4]nonane and tetrafluoroboric acid ($SBP \cdot BF_4$). These salts may be used alone or may be used two or more kinds thereof.

The polar organic solvent includes, for example, acetonitrile; γ-butyrolactone (GBL); a carbonic acid ester, for example, propylene carbonate (PC), ethylene carbonate (EC), diethyl carbonate (DEC) or ethyl methyl carbonate (EMC). These polar organic solvents may be used alone or may be used two or more kinds thereof <Hybrid Capacitor>

The hybrid capacitor is a capacitor in which a battery reaction, that is, an electrochemical oxidation reduction reaction occurs in any one of the positive electrode and the negative electrode and charge is accumulated in an electric double layer formed on the surface of the other electrode. Since the electric double layer of the positive electrode and the electric double layer of the negative electrode are connected in series in the electric double layer capacitor, only half the capacitance of the electric double layer in the respective positive and negative electrodes is obtained. On the contrary, the hybrid capacitor has a feature in that the approximately twice capacitance as compared to the electric double layer capacitor is obtained although one electrode is used as the electrode in which charge is accumulated in an electric double layer formed thereof. The hybrid capacitor includes, for example, a lithium ion capacitor described below.

<Lithium Ion Capacitor>

The lithium ion capacitor (LIC) is one kind of the hybrid capacitors. In the positive electrode of LIC, similar to EDLC, charge is accumulated in an electric double layer, and the negative electrode of LIC absorbs and releases a lithium ion similar to a lithium ion secondary battery (LIB) described below. In LIC, a single electrode potential of the negative electrode is low similar to LIB and a potential difference from the positive electrode is large. In other words, the voltage between the positive and negative electrodes in LIC is high. Therefore, a high voltage is obtained in LIC as compared to EDLC.

Moreover, although the same positive electrode material as in EDLC is used, the capacitance of LIC which is one kind of the hybrid capacitors is approximately twice as compared to that of EDLC. Due to the high voltage and approximately twice capacitance, the energy capacity which can be stored in LIC is very large as compared to the energy capacity which can be stored in EDLC.

As the positive electrode, activated carbon; graphite; nanocarbon, for example, carbon nanofiber or graphene; or the like is mainly used. As the negative electrode, a lithium-storing material is used. Examples of the lithium-storing material include a carbon-based material, a silicon-based material and a composite oxide of a transition metal and lithium. From the standpoint of a low single electrode potential, a carbon-based material having metal lithium previously stored is preferably used.

As the electrolytic solution, a solution obtained by dissolving a lithium salt which does not cause an electrochemical reaction in the potential range used of the positive electrode in a polar solvent can be used. The salt which does not cause an electrochemical reaction in the potential range used of the positive electrode includes, for example, lithium hexafluorophosphate ($LiPF_6$) and lithium tetrafluoroborate ($LiBF_4$). The polar solvent includes, for example, a carbonic acid ester, for example, propylene carbonate (PC), ethylene carbonate (EC), diethyl carbonate (DEC) or ethyl methyl carbonate (EMC); and various ionic liquids. The salts and polar solvents may be used alone or may be used two or more kinds thereof, respectively.

<Redox Capacitor>

The redox capacitor is a capacitor in which the electrode (solid phase) side of the electrode-electrolytic solution interface is charged upon a redox reaction. In comparison with EDLC in which the charge of the electrode side is dependent on the polarization, the redox capacitor has the feature of capable of obtaining a high capacity because the charge density of the electrode surface is very high. As the electrolytic solution, a solution obtained by dissolving a salt which does not cause an electrochemical reaction in the potential range used in a polar solvent, an ionic liquid or the like can be used.

<Lithium Secondary Battery>

The lithium secondary battery refers to a secondary battery in which lithium ion moves between the positive and negative electrodes at the time of charging and discharging. The lithium secondary battery includes a lithium ion secondary battery using a lithium-storing material as the negative electrode active material and a metal lithium secondary battery using metallic lithium as the negative electrode active material.

<Negative Electrode of Lithium Ion Secondary Battery>

As the negative electrode active material of the lithium ion secondary battery, a lithium-storing material is used. Examples of the lithium-storing material include a carbon-based material, a silicon-based material and a composite oxide of a transition metal and lithium.

The carbon-based material is preferably used from the standpoint that the balance between the storable amount of lithium per mass and the difficulty of deterioration due to absorption and release of lithium is good. The carbon-based material includes, for example, graphite, for example, natural graphite or artificial graphite; amorphous carbon, for example, hard carbon, soft carbon or mesoporous carbon; and nanocarbon material, for example, carbon nanotube or graphene.

The silicon-based material is preferably used from the standpoint that the storable amount of lithium per mass is large. The silicon-based material includes, for example, silicon, silicon monoxide (SiO) and silicon dioxide ($SiO_2$).

Lithium titanate which is one kind of composite oxide of a transition metal and lithium is preferably used from the standpoint that the deterioration due to absorption and release of lithium is difficult to occur.

The negative electrode of lithium ion secondary battery includes, for example, an electrode obtained by coating a negative electrode material containing the negative electrode active material described above on a metal foil. In the negative electrode material, a binder, for example, polyvinylidene fluoride (PVDF) or a styrene-butadiene copolymer (SBR); a conductive agent, for example, carbon black or a nanocarbon material; a dispersing agent; a thickener; and the like may be mixed, if desired. The metal used in the metal foil includes, for example, copper and aluminum.

<Positive Electrode of Lithium Secondary Battery>

The positive electrode active material of the lithium secondary battery includes, for example, a composite oxide of a transition metal and lithium, a composite salt having an olivine structure of a transition metal and lithium and sulfur.

The composite oxide of a transition metal and lithium includes, for example, composite oxides of one or more transition metals selected from cobalt, nickel and manganese and lithium. With the composite oxide can be further composed a typical metal, for example, aluminum or magnesium; or a transition metal, for example, titanium or chromium.

The composite salt having an olivine structure of a transition metal and lithium includes, for example, composite salt having an olivine structure of a transition metal of at least one of iron and manganese and lithium.

The positive electrode of the lithium secondary battery includes, for example, an electrode obtained by coating a positive electrode material containing the positive electrode active material described above on a metal foil. In the positive electrode material, a binder, for example, polyvinylidene fluoride or an acrylic acid ester copolymer; a conductive agent, for example, carbon black or a nanocarbon material; a dispersing agent; a thickener; and the like may be mixed, if desired. The metal used in the metal foil includes, for example, aluminum.

<Electrolytic Solution of Lithium Secondary Battery>

The electrolytic solution of the lithium secondary battery includes, for example, a solution obtained by dissolving a lithium salt in a polar solvent and a solution obtained by dissolving a lithium salt in an ionic liquid.

The polar solvent used for the electrolytic solution of the lithium secondary battery includes, for example, a carbonic acid ester, for example, propylene carbonate (PC), ethylene carbonate (EC), diethyl carbonate (DEC) or ethyl methyl carbonate (EMC); and a fatty acid ester, for example, ethyl acetate, propyl acetate or ethyl propionate, and the polar solvents may be used alone or may be used two or more kinds thereof.

The lithium salt used in the electrolytic solution of the lithium secondary battery includes, for example, lithium hexafluorophosphate ($LiPF_6$) and lithium tetrafluoroborate ($LiBF_4$), and the lithium salts may be used alone or may be used two or more kinds thereof <Structure of Electrochemical Element>

The electrochemical element usually has a structure of laminating in order the positive electrode, the separator and the negative electrode which are the members of the electrochemical element. The electrolytic solution is absorbed (impregnated) in the positive electrode, the negative electrode and the separator, respectively. The type of the laminate structure includes, for example, a cylindrical form obtained by winding into a roll after laminating each member, a wound flat type (flat type) obtained by crushing a cylindrical form to form two planes and curved both ends, a meandering type in which an separator cut into a sheet is inserted between a separator of a meandering form, and a sheet laminate type in which an separator cut into a sheet and an electrode cut into a sheet are laminated.

<Separator for Electrochemical Element>

As a raw material of the separator for the electrochemical element of the invention, a beaten solvent spun cellulose fiber (fibrillated solvent spun cellulose fiber) is used. The solvent spun cellulose fiber means a cellulose fiber obtained by directly dissolving in an organic solvent without going through a cellulose derivative. The solvent spun cellulose fiber is also referred to as "Lyocell (registered trademark)" or "Tencel (registered trademark)" sometimes.

The effect of being beaten (fibrillated) includes, for example, the liquid retention property of the electrolytic solution is improved because the fiber forms a fine structure inside the separator, and the internal short-circuit hardly occurs because the pores becomes small.

In the invention, since in the fibrillated solvent spun cellulose fiber the molecules are highly oriented in the longitudinal direction of the fiber, when the mechanical force, for example, friction is applied thereto in the wet state, the fiber is easily miniaturized to generate a thin and long fine fiber. As compared to a beaten natural cellulose fiber or a bacterial cellulose fiber, the fibrillated solvent spun cellulose fiber hardly forms a film and can firmly retain the electrolytic solution between the fine fibers so that it has the excellent liquid retention property of the electrolytic solution.

In the invention, a method for producing the fibrillated solvent spun cellulose fiber includes, for example, a method in which short fibers of solvent spun cellulose are dispersed in water or the like in an appropriate concentration and the resulting dispersion is beaten by a refiner, a beater, a mill, a pulverizer, a rotary blade system homogenizer in which a shear force is provided by a high-speed rotating blade, a double-cylinder type high speed homogenizer in which a shear force is generated between an inner blade which has a cylinder shape and rotates with a high speed and a fixed outer blade, a ultrasonic wave crusher in which a material is miniaturized by an impact of ultrasonic wave, or a high-pressure homogenizer in which at least 20 MPa pressure difference is applied to a fiber suspension to pass through a small diameter orifice to provide a high speed, and by colliding them to cause rapid deceleration whereby a shear forth or a cutting force is applied to the fiber. In particular, a method of beating by a refiner is preferred.

The modified freeness of the fibrillated solvent spun cellulose fiber is preferably 75 ml or more and 220 ml or less, more preferably 90 ml or more and 175 ml or less, and still more preferably 90 ml or more and 120 ml or less. By setting the modified freeness to 220 ml or less, denseness of the separator can be sufficiently ensured and the short-circuit defect rate is preferably decreased. Further, by setting the modified freeness to 75 ml or more, it is prevented that the fiber length becomes too short and good tensile strength can be maintained. Moreover, it is prevented that the fibrillated solvent spun cellulose fiber becomes too thin and good puncture strength can be maintained. Therefore, it is preferably possible to prevent the occurrence of internal short-circuit and the decrease in productivity.

The modified freeness is a value measured in accordance with JIS P8121-2:2012, except that an 80-mesh wire netting having a wire diameter of 0.14 mm and an aperture size of 0.18 mm is used as a sieving plate and a sample concentration is set to 0.1% by mass.

The length weighted average fiber length of the fibrillated solvent spun cellulose fiber is preferably 0.2 mm or more and 3.0 mm or less, more preferably 0.2 mm or more and 2.0 mm or less, and still more preferably 0.2 mm or more and 1.6 mm or less. By setting the length weighted average fiber length to 0.2 mm or more, it can be prevented that the rate of falling out from a papermaking net to flow out to the drainage during wet papermaking increases and that fluff occurs on the surface of separator due to rubbing. Further, by setting the length weighted average fiber length to 3.0 mm or less, it can be prevented that the fibers are entangled to form lumps and as a result it can be prevented that unevenness in thickness occurs.

The length weighted average fiber length of the fibrillated solvent spun cellulose fiber of the invention was measured using Kajaani FiberLab V3.5 (manufactured by Metso Automation, Inc.). In Kajaani FiberLab V3.5 (manufactured by Metso Automation, Inc.), with the individual fibers passing through the detector, a true entire length (L) of a bent fiber and the shortest length (l) between the both end portions of a bent fiber can be measured. The "length weighted average fiber length" is a length weighted average fiber length calculated from the projection fiber length in which the shortest length (l) between the both end portions of a bent fiber is measured.

The separator for an electrochemical element of the invention is characterized by including, as the synthetic fiber, from 5 to 40% by mass of a core-sheath type composite fiber which is composed of a core component made of a resin having a melting point of 160° C. or more and a sheath component made of polyethylene and has a fiber diameter of 6.0 µm or less. Hereinafter, unless otherwise specified, the "core-sheath type composite fiber which is composed of a core component made of a resin having a melting point of 160° C. or more and a sheath component made of polyethylene and has a fiber diameter of 6.0 µm or less" is abbreviated as a "core-sheath type composite fiber" sometimes.

In the invention, the ratio of the core-sheath type composite fiber with respect to the separator is preferably from 5 to 40% by mass, more preferably from 15 to 35% by mass, and still more preferably from 20 to 30% by mass. When the separator contains the core-sheath type composite fiber, the adhesion point is strengthened by melting between fibers so that the effect that mechanical strength of the separator is increased is obtained. Further, in the separator having a sheet form, the adhesion of sheet surface becomes strong by melting of the core-sheath type composite fiber present on the sheet surface so that the effect that the fluff on the surface is suppressed is obtained.

In the case where the ratio of the core-sheath type composite fiber is less than 5% by mass, since the adhesion point between fibers does not increase, the effect of increasing the mechanical strength is not exhibited. In addition, due to too close mesh the impedance of the separator increases. Further, in the case where the ratio of the core-sheath type composite fiber is more than 40% by mass, although the adhesion point between fibers increases, the fibers on the sheet surface are easily taken as a lump and fluffs are liable to occur. Since the core-sheath type composite fiber has a larger fiber diameter than a cellulose fiber, mesh of the sheet itself is hardly close, the pore diameter increases and the internal resistance decreases, but the internal short-circuit is likely to occur.

In the invention, the resin having a melting point of 160° C. or more which is used as the core component of the core-sheath type composite fiber includes, resins, for example, polyester, acrylic, polypropylene, wholly aromatic polyester, wholly aromatic polyester amide, polyamide, semi-aromatic polyamide, wholly aromatic polyamide, wholly aromatic polyether, wholly aromatic polycarbonate, polyimide, polyamide-imide (PAI), polyetheretherketone (PEEK), polyphenylene sulfide (PPS), poly-p-phenylene benzobisoxazole (PBO), polybenzimidazole (PBI), polytetrafluoroethylene (PTFE) or an ethylene-vinyl alcohol copolymer.

These core-sheath type composite fibers may be used alone or may be used in combination of two or more kinds thereof. Among these, polyester, acrylic, polypropylene, wholly aromatic polyester, wholly aromatic polyester amide, polyamide, semi-aromatic polyamide and wholly aromatic polyamide are preferred, and polyester, acrylic and polypropylene are more preferred.

It is preferred that the melting point of the resin used as the core component is 160° C. or more because the core portion can keep the shape. The melting point of the resin is more preferably 163° C. or more. The melting point is a value measured in accordance with JIS K7121:2012.

In the invention, by incorporating the core-sheath type composite fiber in which polyethylene is used in the sheath portion of the core-sheath type composite fiber, as compared to other synthetic fibers, the core-sheath type composite fiber is uniformly entangled with the fibrillated solvent spun cellulose fiber to easily form a network structure and melts by application of heat to be able to increase the adhesive strength, whereby a separator for an electrochemical element having a higher smoothness of the surface and being excellent in denseness and mechanical strength can be obtained.

The melting point of polyethylene for the sheath component is preferably 115° C. or more from the standpoint of the effect of suppressing the occurrence of fluff and is preferably 140° C. or less from the standpoint of the effect of suppressing the occurrence of fluff. The melting point is a value measured in accordance with JIS K7121:2012.

By setting the fiber diameter of the core-sheath type composite fiber to 6.0 μm or less, it is able to obtain the separator having the desired thickness and to achieve the sufficient denseness. The fiber diameter of the core-sheath type composite fiber can be measured by scanning electron microscopy observation of the separator section.

It is no problem to blend synthetic fibers other than the core-sheath type composite fiber defined above as synthesis fibers and it does not exclude to include a core-sheath type composite fiber having a fiber diameter of more than 6.0 μm or other synthetic fibers, but, from the standpoint of maintaining strength, it is preferred to blend other synthetic fibers so that the content of the synthetic fibers summed with the core-sheath type composite fiber defined above with respect to the separator does not exceed 40% by mass.

Other synthetic fibers are not particularly limited and polyester, acrylic, wholly aromatic polyester, wholly aromatic polyester amide, polyamide, semi-aromatic polyamide and wholly aromatic polyamide are preferred, and polyester and acrylic are more preferred.

The average fiber diameter of the core-sheath type composite fiber is more preferably from 0.1 to 6.0 μm, still more preferably from 1.5 to 5.8 μm, and particularly preferably from 2.0 to 5.5 μm. It is preferred that the average fiber diameter is 0.1 μm or more because falling off of the fiber from the separator due to too thin diameter can be prevented. It is preferred that average fiber diameter is 6.0 μm or less because the thickness of the separator can be easily reduced and the sufficient denseness is easily ensured. Further, since as the average fiber diameter increases, the number of fibers per weight decreases, the adhesion portion between fibers reduces so that the fluff evaluation may be deteriorated or the mechanical strength of the separator may be reduced sometimes. Furthermore, in the case where the thickness of the separator is reduced to less than 20.0 μm, the maximum pore diameter is increased and the internal short-circuit defect rate may be increased sometimes. From the above, it is preferred to set the average fiber diameter to 6.0 μm or less.

The average fiber diameter is an average value of 100 fiber diameters obtained by measuring the cross-sectional areas of the 100 fibers randomly selected from the fibers forming the separator by scanning electron microscopy observation of the separator section and calculating the fiber diameters by regarding the cross-sectional shape of the fiber as a true circle. In the invention, it is preferred that the fiber diameter of all of the core-sheath type composite fibers is 6.0 μm or less.

The fiber length of the synthetic fiber is preferably from 0.3 to 10 mm, more preferably from 0.5 to 5 mm, and still more preferably from 1 to 3 mm. By setting the fiber length to 0.3 mm or more, it can be prevented the fiber from falling off from the separator. Further, by setting the fiber length to 10 mm or less, it can be prevented the fiber from entangling to form lumps, thereby causing unevenness in thickness. In addition, a preferred fiber length of the core-sheath type composite fiber having a fiber diameter of 6.0 μm or less is also within the same range as described above.

In the invention, the ratio of the fibrillated solvent spun cellulose fiber with respect to the separator is preferably from 60 to 95% by mass, more preferably from 65 to 85% by mass, and still more preferably from 70 to 80% by mass.

By setting the ratio of the fibrillated solvent spun cellulose fiber to 60% by mass or more, even when the basis weight is low, the liquid retention property of the electrolytic solution is sufficient to be able to prevent the internal resistance from increasing. Further, the denseness of the separator is sufficient to be able to prevent the internal short-circuit defect rate from increasing. By setting the ratio of the fibrillated solvent spun cellulose fiber to 95% by mass or less, the mechanical strength of the separator can be maintained because the sufficient amount of the core-sheath type composite fiber can be incorporated into the separator. Further, it is able to prevent the deterioration of the strength of the sheet surface to occur fluffs. Furthermore, in the thickness adjustment by hot calendar it is able to prevent the fibrillated solvent spun cellulose fiber from filling voids to deteriorate the liquid retention property and to increase the internal resistance.

The separator of the invention may further contains a fibrillated natural cellulose fiber. In the invention, as the fibrillated natural cellulose fiber, that is treated with a refiner, a beater, a mill, a grinder type pulverizer, a rotary blade system homogenizer in which a shear force is provided by a high-speed rotating blade, a double-cylinder type high speed homogenizer in which a shear force is generated between an inner blade which has a cylinder shape and rotates with a high speed and a fixed outer blade, a ultrasonic wave crusher in which a material is miniaturized by an impact of ultrasonic wave, or a high-pressure homogenizer in which at least 20 MPa pressure difference is applied to a fiber suspension to pass through a small diameter orifice to provide a high speed, and by colliding them to cause rapid deceleration whereby a shear forth or a cutting force is applied to the fiber can be used. Among these, in particular, the fibrillated natural cellulose fiber treated with a high-pressure homogenizer is preferred from the standpoint of the high of productivity and the uniformity of fibrillation state.

In the invention, as the raw material of the fibrillated natural cellulose fiber, a wood pulp, for example, a softwood pulp or a hardwood pulp, a cotton linter pulp, a cotton pulp and a non-wood pulp derived, for example, from hemp, bagasse, kenaf, bamboo or straw can be used. Among these, from the standpoint of the fiber strength and quality stability after fibrillation and the cellulose purity, cellulose derived from cotton is preferred.

In the invention, the content of the fibrillated natural cellulose fiber with respect to the separator is preferably 10% by mass or less, more preferably 7% by mass or less, and still more preferably 5% by mass or less.

Although the fibrillated natural cellulose fiber has a tendency to be poor in the uniformity of thickness of a single fiber as compared to the fibrillated solvent spun cellulose fiber, it has a characteristic that the physical entanglement and hydrogen bonding force between the fibers are strong. By setting the content of the fibrillated natural cellulose fiber to 10% by mass or less, without becoming too dense in spider web-like fiber network, good ion conductivity is ensured so that the case where the internal resistance increases and the case where the discharge characteristic decreases can be prevented. Further, it can be prevented that productivity of the separator using a wet papermaking method described later is deteriorated by decrease in dewaterability.

In the invention, the separator may contain fibers other than the fibrillated solvent spun cellulose fiber, the synthetic fiber and the fibrillated natural cellulose fiber. Since maintenance and improvement of strength due to hydrogen bonds are expected, the separator may contain, for example, a rayon fiber or a non-fibrillated pulp fiber. In addition, since there is a possibility of causing deterioration in the strength, it is preferred that the separator does not contain an inorganic fiber.

The separator for an electrochemical element of the invention is preferably a wet-laid nonwoven fabric. The wet-laid nonwoven fabric is a dry fiber web obtained by drying a wet papermaking web. The wet-laid nonwoven fabric is excellent in uniform dispersibility of fibers and forms a separator for an electrochemical element in which short-circuit hardly occurs and which has high reliability. The wet-laid fiber web is formed by a wet papermaking method. In particular, the denseness, short-circuit preventing property, ion permeability and surface smoothness are excellent.

In the wet papermaking method, a wet-laid fiber web can be formed by various wet papermaking systems. The wet papermaking system includes, for example, a horizontal fourdrinier system, an inclined wire type short wire system, a cylinder system, a downflow cylinder-downflow cylinder combination system, a downflow cylinder-cylinder suction former combination system, an inclined wire type short wire-downflow cylinder combination system, an inclined wire type short wire-cylinder suction former combination system, a horizontal fourdrinier-downflow cylinder combination system, and an inclined wire type short wire-inclined wire type short wire combination system.

To the raw slurry, a dispersing agent, a thickener, an inorganic filler, an organic filler, an antifoaming agent, a releasing agent, and the like can be appropriately added, if desired, in addition to the fiber materials. The solid content concentration of the raw material slurry is preferably approximately from 5 to 0.001% by mass. The raw material slurry is further diluted with water to a predetermined concentration and then a wet-laid fiber web is formed.

Then, the wet-laid fiber web is dried by a Yankee dryer and thus a dry fiber web can be produced. A Yankee dryer and a hot air hood dryer may be used in combination. It is preferred to dry the wet-laid fiber web at the drying temperature in the range of 90° C. or more and 160° C. or less depending on the drying capacity and papermaking speed. As the surface temperature of Yankee dryer is low, peelability of the dry fiber web becomes better.

Onto the surface of Yankee dryer, an appropriate amount of a release agent can be applied. Further, when the surface of Yankee dryer has a mirror surface, peelability of the dry fiber web becomes good. The dry fiber web may be used as it is as a separator for an electrochemical element, and may be used as a separator for an electrochemical element after being subjected to a calendering treatment, a heat calendering treatment, a heat treatment or the like, if desired.

The basis weight of the separator for an electrochemical element is preferably from 4.0 to 30.0 g/m$^2$, more preferably from 5.0 to 15.0 g/m$^2$, and still more preferably from 6.0 to 10.0 g/m$^2$. By setting the basis weight to 4.0 g/m$^2$ or more, the sufficient mechanical strength is easily obtained, and the sufficient insulation between the positive electrode and the negative electrode can be ensured and the deterioration of the internal short-circuit defect rate and the cycle characteristic can be prevented. By setting the basis weight to 30.0 g/m$^2$ or less, the case where the internal resistance of the electrochemical element increases and the case where the discharge characteristic of the electrochemical element decreases can be prevented. The basis weight of the separator of the invention is a value measured in accordance with JIS P8124:2011.

The thickness of the separator for an electrochemical element is preferably from 6.0 to 50.0 µm, more preferably from 8.0 to 25.0 µm, and still more preferably from 10.0 to 17.0 µm. By setting the thickness to 6.0 µm or more, the sufficient mechanical strength is easily obtained, and the sufficient insulation between the positive electrode and the negative electrode can be ensured and the deterioration of the internal short-circuit defect rate and the cycle characteristic can be prevented. By setting the thickness to 50.0 µm or less, the case where the internal resistance of the electrochemical element increases and the case where the discharge characteristic of the electrochemical element decreases can be prevented. The thickness of the separator of the invention is a value measured using an external micrometer defined in JIS B7502:2016 under a load of 5 N.

The tensile strength of the separator for an electrochemical element is preferably 100 N/m or more, more preferably 330 N/m or more, still more preferably 380 N/m or more, and yet still more preferably 400 N/m or more. By setting the tensile strength to 100 N/m or more, disconnection of the separator during winding operation can be prevented, and further by setting the tensile strength to 330 N/m or more, the occurrence of internal short-circuit defect can be prevented. The tensile strength of the separator of the invention is a value measured in accordance with JIS P8113:2006.

The impedance of the separator for an electrochemical element is correlated with the internal resistance when the electrochemical element is assembled, and is preferably 0.50Ω or less, more preferably 0.45Ω or less, and still more preferably 0.40Ω or less. By setting the impedance to 0.50Ω or less, the internal resistance increases so that the deterioration of the discharge characteristic and cycle characteristic can be prevented. Further, by setting the impedance to 0.40Ω or less, the separator extremely excellent in the discharge characteristic and cycle characteristic can be obtained.

EXAMPLE

The invention will be described in more detail with reference to the examples, but the invention should not be construed as being limited thereto.

Example 1

25 Parts of a core-sheath type composite fiber (PP/PE core-sheath type composite fiber) composed of a core component made of polypropylene (melting point of 165° C.) and a sheath component made of polyethylene (melting point of 135° C.) having a fineness of 0.2 dtex (fiber diameter of 5.2 µm) and a fiber length of 3 mm, 70 parts of a fibrillated solvent spun cellulose fiber having the modified freeness of 90 ml obtained by fibrillating a solvent spun cellulose fiber having an average fiber diameter of 11.5 µm and a fiber length of 4 mm using a refiner, and 5 parts of a fibrillated natural cellulose fiber obtained by fibrillating a natural cellulose fiber by a high-pressure homogenizer were mixed together, and macerated in water of pulper under stirring with agitator to prepare a uniform raw material slurry (having concentration of 0.5% by mass). Using the raw material slurry a wet sheet was obtained by an inclined type short wire papermaking machine, and after drying by a Yankee dryer at temperature of 135° C., subjected to a calendering treatment to obtain a separator having a basis weight of 8.8 g/m$^2$ and a thickness of 15.7 µm. In addition, the part is mass basis.

Example 2

In the same manner as in Example 1, except for changing the blending ratio to 5 parts of the core-sheath type composite fiber, 90 parts of the fibrillated solvent spun cellulose fiber and 5 parts of the fibrillated natural cellulose fiber, a separator having a basis weight of 9.0 g/m² and a thickness of 16.0 μm was obtained.

Example 3

In the same manner as in Example 1, except for changing the blending ratio to 40 parts of the core-sheath type composite fiber, 55 parts of the fibrillated solvent spun cellulose fiber and 5 parts of the fibrillated natural cellulose fiber, a separator having a basis weight of 8.9 g/m² and a thickness of 15.7 μm was obtained.

Example 4

In the same manner as in Example 1, except for changing the blending ratio to 15 parts of the core-sheath type composite fiber, 80 parts of the fibrillated solvent spun cellulose fiber and 5 parts of the fibrillated natural cellulose fiber, a separator having a basis weight of 9.0 g/m² and a thickness of 15.7 μm was obtained.

Example 5

In the same manner as in Example 1, except for changing the blending ratio to 35 parts of the core-sheath type composite fiber, 60 parts of the fibrillated solvent spun cellulose fiber and 5 parts of the fibrillated natural cellulose fiber, a separator having a basis weight of 8.8 g/m² and a thickness of 15.6 μm was obtained.

Example 6

In the same manner as in Example 1, except for changing the blending ratio to 25 parts of the core-sheath type composite fiber, 65 parts of the fibrillated solvent spun cellulose fiber and 5 parts of the fibrillated natural cellulose fiber and blending further 5 parts of a stretched polyethylene terephthalate (PET) fiber having a fineness of 0.06 dtex (fiber diameter of 2.4 μm), a fiber length of 3 mm, and a melting point of 245° C., a separator having a basis weight of 8.8 g/m² and a thickness of 15.5 μm was obtained.

Example 7

In the same manner as in Example 1, except for changing the blending ratio to 25 parts of the core-sheath type composite fiber, 65 parts of the fibrillated solvent spun cellulose fiber and 5 parts of the fibrillated natural cellulose fiber and blending further 5 parts of a polypropylene (PP) single fiber having a fineness of 0.1 dtex (fiber diameter of 3.9 μm), a fiber length of 3 mm, and a melting point of 165° C., a separator having a basis weight of 9.0 g/m² and a thickness of 16.3 μm was obtained.

Example 8

In the same manner as in Example 1, except for changing the blending ratio to 35 parts of the core-sheath type composite fiber and 65 parts of the fibrillated solvent spun cellulose fiber, a separator having a basis weight of 8.8 g/m² and a thickness of 15.5 μm was obtained.

Example 9

In the same manner as in Example 1, except for blending 70 parts of a fibrillated solvent spun cellulose fiber having the modified freeness of 200 ml obtained by fibrillating a solvent spun cellulose fiber having an average fiber diameter of 11.5 μm and a fiber length of 4 mm using a refiner in place of the fibrillated solvent spun cellulose fiber used in Example 1, a separator having a basis weight of 8.9 g/m² and a thickness of 16.6 μm was obtained.

Comparative Example 1

In the same manner as in Example 1, except for changing the blending ratio to 3 parts of the core-sheath type composite fiber, 92 parts of the fibrillated solvent spun cellulose fiber and 5 parts of the fibrillated natural cellulose fiber, a separator having a basis weight of 8.8 g/m² and a thickness of 15.8 μm was obtained.

Comparative Example 2

In the same manner as in Example 1, except for changing the blending ratio to 45 parts of the core-sheath type composite fiber, 50 parts of the fibrillated solvent spun cellulose fiber and 5 parts of the fibrillated natural cellulose fiber, a separator having a basis weight of 8.9 g/m² and a thickness of 15.7 μm was obtained.

Comparative Example 3

In the same manner as in Example 1, except for blending 25 parts of a PP/PE core-sheath type composite fiber composed of a core component made of polypropylene (melting point of 165° C.) and a sheath component made of polyethylene (melting point of 135° C.) having a fineness of 0.8 dtex (fiber diameter of 10.4 μm) and a fiber length of 5 mm in place of the core-sheath type composite fiber used in Example 1, a separator having a basis weight of 8.8 g/m² and a thickness of 17.0 μm was obtained.

Comparative Example 4

In the same manner as in Example 1, except for blending 20 parts of a PP/PE core-sheath type composite fiber composed of a core component made of polypropylene (melting point of 165° C.) and a sheath component made of polyethylene (melting point of 135° C.) having a fineness of 0.8 dtex (fiber diameter of 10.4 μm) and a fiber length of 5 mm, 10 parts of a PP single fiber having a fineness of 0.1 dtex (fiber diameter of 3.9 μm) and a fiber length of 3 mm and 70 parts of the fibrillated solvent spun cellulose fiber, a separator having a basis weight of 9.0 g/m² and a thickness of 17.4 μm was obtained.

Comparative Example 5

In the same manner as in Example 1, except for blending 25 parts of a PP single fiber having a fineness of 0.1 dtex (fiber diameter of 3.9 μm) and a fiber length of 3 mm in place of the core-sheath type composite fiber used in Example 1, a separator having a basis weight of 9.0 g/m² and a thickness of 17.7 μm was obtained.

Comparative Example 6

In the same manner as in Example 1, except for blending 25 parts of a stretched PET fiber having a fineness of 0.06 dtex (fiber diameter of 2.4 μm), a fiber length of 3 mm, and a melting point of 245° C. in place of the core-sheath type composite fiber used in Example 1, a separator having a basis weight of 9.0 g/m² and a thickness of 17.5 μm was obtained.

With the separators obtained in the examples and comparative examples, the measurements and evaluations shown below were performed and the results were shown in Table 1.

[Measurement of Basis Weight]

The basis weight was measured in accordance with JIS P8124:2011.

[Measurement of Thickness]

The thickness was a value measured using an external micrometer defined in JIS B7502:2016 under a load of 5 N.

[Evaluation of Tensile Strength]

With the separator produced a tensile strength in the longitudinal direction was measured in accordance with JIS P8113:2006 using a desktop material testing machine (STA-116750, trade name, manufactured by Orientec Co., Ltd.). The size of the test piece was set to 250 mm in longitudinal direction and 50 mm in width, the distance between the two jaws was set to 100 mm, and the tensile speed was set to 200 mm/min.

[Evaluation of Impedance]

The separator produced was immersed into an electrolytic solution (1M-LiPF$_6$/ethylene carbonate (EC)+diethyl carbonate (DEC)+dimethyl carbonate (DMC) (1:1:1 in volume ratio), then sandwiched between two approximately cylindrical copper electrodes, and a resistive component of alternative current impedance at 200 kHz was measured using a LCR meter (LCR-821, apparatus name, manufactured by Instec Inc.).

[Evaluation of Internal Short-Circuit Defect Rate]

The separator produced was interposed between electrodes made of aluminum foil and wound to produce an electrode group, and then without impregnating in an electrolytic solution, conduction between the electrodes was examined by a tester, whereby the presence or absence of the short circuit was confirmed. 100 Electrode groups were examined, and the internal short-circuit defect rate was calculated from the number of short-circuit with respect to the number of the total electrode groups.

[Evaluation of Surface Strength]

With the Yankee dryer surface (Yankee surface) of the separator produced, the paper surface was rubbed 20 times with an index finger, and the occurrence of fluff was visually observed and evaluated according to the criteria shown below. The test was carried out by 5 persons and the result was shown in the average. In the judgment of "○" or "◉" the problem due to fluff did not occur in the process. In the judgment of "Δ" or "x" the fluff falls off from the sheet surface of the separator during the slit processing or during the roll transport in the battery production to accumulate and may sometimes stain transfer rollers or in the process of bonding the joint portion in battery production the fluff may be caught in the joint portion to interfere with the sealing. Therefore, it is required to optimize the roll type attached to the production facility, to adjust tension, or to adjust the surface to be fed of the paper surfaces.

◉: Fiber dregs due to fluff did not attach to the index finger.
○: Fiber dregs due to fluff almost did not attach to the index finger.
Δ: Fiber dregs due to fluff slightly attached to the index finger.
x: Fiber dregs due to fluff attached to the index finger.

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Fiber Blend | Fibrillated Solvent Spun Cellulose Fiber Modified Freeness: 90 ml | parts | 70 | 90 | 55 | 80 | 60 | 65 | 65 | 65 | |
| | Fibrillated Solvent Spun Cellulose Fiber Modified Freeness: 200 ml | parts | | | | | | | | | 70 |
| | PP/PE Core-sheath Type Composite Fiber 5.2 μm × 3 mm | parts | 25 | 5 | 40 | 15 | 35 | 25 | 25 | 35 | 25 |
| | PP/PE Core-sheath Type Composite Fiber 10.4 μm × 5 mm | parts | | | | | | | | | |
| | PP Single Fiber 3.9 μm × 3 mm | parts | | | | | | | 5 | | |
| | Stretched PET Fiber 2.4 μm × 3 mm | parts | | | | | | 5 | | | |
| | Fibrillated Natural Cellulose Fiber | parts | 5 | 5 | 5 | 5 | 5 | 5 | 5 | | 5 |
| Basis Weight | | g/m² | 8.8 | 9.0 | 8.9 | 9.0 | 8.8 | 8.8 | 9.0 | 8.8 | 8.9 |
| Thickness | | μm | 15.7 | 16.0 | 15.7 | 15.7 | 15.6 | 15.5 | 16.3 | 15.5 | 16.6 |
| Tensile Strength | | N/m | 430 | 401 | 403 | 434 | 407 | 433 | 425 | 447 | 388 |
| Impedance | | Ω | 0.40 | 0.42 | 0.37 | 0.41 | 0.39 | 0.41 | 0.45 | 0.43 | 0.44 |
| Internal Short-circuit Defect Rate | | % | 0 | 0 | 0 | 0 | 0 | 0 | 0 | 0 | 0 |
| Fluff Evaluation | | — | ◉ | ○ | ○ | ○ | ○ | ○ | ○ | ○ | ○ |

| | | | Comparative Example 1 | Comparative Example 2 | Comparative Example 3 | Comparative Example 4 | Comparative Example 5 | Comparative Example 6 |
|---|---|---|---|---|---|---|---|---|
| Fiber Blend | Fibrillated Solvent Spun Cellulose Fiber Modified Freeness: 90 ml | parts | 92 | 50 | 70 | 70 | 70 | 70 |
| | Fibrillated Solvent Spun Cellulose Fiber Modified Freeness: 200 ml | parts | | | | | | |
| | PP/PE Core-sheath Type Composite Fiber 5.2 μm × 3 mm | parts | 3 | 45 | | | | |

TABLE 1-continued

| | | | | | | | |
|---|---|---|---|---|---|---|---|
| PP/PE Core-sheath Type Composite Fiber 10.4 μm × 5 mm | parts | | | | 25 | 20 | |
| PP Single Fiber 3.9 μm × 3 mm | parts | | | | | 10 | 25 |
| Stretched PET Fiber 2.4 μm × 3 mm | parts | | | | | | 25 |
| Fibrillated Natural Cellulose Fiber | parts | 5 | 5 | 5 | | 5 | 5 |
| Basis Weight | g/m² | 8.8 | 8.9 | 8.8 | 9.0 | 9.0 | 9.0 |
| Thickness | μm | 15.8 | 15.7 | 17.0 | 17.4 | 17.7 | 17.5 |
| Tensile Strength | N/m | 329 | 307 | 298 | 275 | 288 | 290 |
| Impedance | Ω | 0.51 | 0.38 | 0.51 | 0.51 | 0.45 | 0.42 |
| Internal Short-circuit Defect Rate | % | 0 | 3 | 5 | 3 | 2 | 2 |
| Fluff Evaluation | — | ○ | X | X | X | X | X |

As shown in Table 1, in the separators of Examples 1 to 9, the mechanical strength was high and the internal short-circuit defect was a little in spite of the low basis weight and low thickness, because the ratio of the core-sheath type composite fiber to the separator was from 5 to 40% by mass. Further, the results of the excellent impedance indicating the resistance component and the good fluff evaluation were also obtained.

In the separator of Comparative Example 1, the ratio of the core-sheath type composite fiber to the separator was less than 5% by mass and as compared with Examples 1 to 9, the result of deteriorating the tensile strength and impedance was obtained, although the internal short-circuit defect rate and fluff evaluation were good.

In the separator of Comparative Example 2, the ratio of the core-sheath type composite fiber to the separator was more than 40% by mass and as compared with Examples 1 to 9, the result of deteriorating the tensile strength, internal short-circuit defect rate and fluff evaluation was obtained.

In the separator of Comparative Example 3, the ratio of the core-sheath type composite fiber to the separator was 25% by mass but since the fiber diameter was 10.4 μm which was thicker than 6.0 μm, as compared with Examples 1 to 9, the results that because of a small number of adhesion fibers in the sheet of the separator, the tensile strength was low and the fluff evaluation was also deteriorated and that because of the thick fiber diameter, the impedance and internal short-circuit defect rate were also deteriorated were obtained.

In the separator of Comparative Example 4, the ratio of the core-sheath type composite fiber to the separator was 20% by mass but since the fiber diameter was 10.4 μm which was thicker than 6.0 μm and 10% by mass of the PP single fiber was blended, as compared with Examples 1 to 9, the results that because of a small number of adhesion fibers in the sheet of the separator, the tensile strength was low and the fluff evaluation was also deteriorated and that because of the thick fiber diameter, the impedance and internal short-circuit defect rate were also deteriorated were obtained.

In the separator of Comparative Example 5, because the core-sheath type composite fiber was not included and the ratio of the PP single fiber was 25% by mass, as compared with Examples 1 to 9, the results that because of a small number of adhesion fibers in the sheet, the tensile strength was low and the fluff evaluation was also deteriorated were obtained.

In the separator of Comparative Example 6, because the core-sheath type composite fiber was not included and the ratio of the stretched PET fiber was 25% by mass, as compared with Examples 1 to 9, the results that because of a small number of adhesion fibers in the sheet, the tensile strength was low and the fluff evaluation was also deteriorated were obtained.

By comparing the examples and the comparative examples, it was found that in the separator for an electrochemical element including the fibrillated solvent spun cellulose fiber and the specific core-sheath type composite fiber, by setting the ratio of the core-sheath type composite fiber to the separator to 5 to 40% by mass, the results of high mechanical strength, low internal short-circuit defect rate, low impedance and good fluff evaluation were obtained.

While the invention has been described in detail and with reference to specific embodiments thereof, it will be apparent to those skilled in the art that various changes and modifications can be made therein without departing from the spirit and scope of the invention. This application is based on a Japanese patent application filed on Oct. 17, 2016 (Japanese Patent Application No. 2016-203720) and a Japanese patent application filed on Sep. 11, 2017 (Japanese Patent Application No. 2017-174268), and the whole contents thereof are incorporated herein by reference.

INDUSTRIAL APPLICABILITY

The separator for an electrochemical element of the invention is applicable to an electrochemical element, for example, an electric double layer capacitor, a hybrid capacitor, a redox capacitor or a lithium secondary battery.

The invention claimed is:

1. A separator for an electrochemical element, comprising: a fibrillated solvent spun cellulose fiber; and a synthetic fiber,
wherein the separator for an electrochemical element contains, as the synthetic fiber, from 5 to 40% by weight of a core-sheath type composite fiber having a fiber diameter of 6.0 μm or less which is composed of: a core component made of a resin having a melting point of 160° C. or more; and a sheath component made of polyethylene, and
wherein a ratio of the fibrillated solvent spun cellulose fiber with respect to the separator is from 55 to 95% by mass.

2. The separator for an electrochemical element according to claim 1,
wherein the fibrillated solvent spun cellulose fiber has a modified freeness measured by the method described below of 75 ml or more and 220 ml or less:
Modified freeness: a value measured in accordance with JIS P8121-2:2012, except that an 80-mesh wire netting having a wire diameter of 0.14 mm and an aperture size of 0.18 mm is used as a sieving plate and a sample concentration is set to 0.1% by weight.

3. An electrochemical element, comprising: the separator for an electrochemical element according to claim 1.

4. An electrochemical element, comprising: the separator for an electrochemical element according to claim 2.

* * * * *